(12) United States Patent
Namuduri et al.

(10) Patent No.: US 8,064,227 B2
(45) Date of Patent: Nov. 22, 2011

(54) RECTIFYING CIRCUIT FOR A MULTIPHASE ELECTRIC MACHINE

(75) Inventors: Chandra S. Namuduri, Troy, MI (US); Kenneth J. Shoemaker, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 12/553,891

(22) Filed: Sep. 3, 2009

(65) Prior Publication Data

US 2010/0060245 A1 Mar. 11, 2010

Related U.S. Application Data

(60) Provisional application No. 61/191,310, filed on Sep. 8, 2008.

(51) Int. Cl.
*H02M 3/335* (2006.01)

(52) U.S. Cl. ............ 363/17; 363/58; 363/108; 363/126; 363/132

(58) Field of Classification Search .................... 363/17, 363/44, 48, 58, 108, 125, 127, 126, 132
See application file for complete search history.

(56) References Cited

U.S. PATENT DOCUMENTS

| | | | |
|---|---|---|---|
| 4,339,704 A * | 7/1982 | McSparran et al. | ............ 322/90 |
| 4,803,472 A | 2/1989 | Murari et al. | |
| 5,991,182 A | 11/1999 | Novac et al. | |
| 6,239,582 B1 | 5/2001 | Buzan et al. | |
| 6,271,712 B1 | 8/2001 | Ball | |
| 6,747,880 B2 | 6/2004 | Grover | |
| 7,015,561 B2 | 3/2006 | Saxelby et al. | |
| 7,084,609 B2 | 8/2006 | Pillote et al. | |
| 7,116,080 B2 | 10/2006 | Chen | |
| 7,199,636 B2 | 4/2007 | Oswald et al. | |
| 7,227,340 B2 | 6/2007 | Chen | |
| 7,271,570 B2 | 9/2007 | O'Gorman et al. | |
| 7,292,445 B2 | 11/2007 | Linke | |
| 2002/0176266 A1 * | 11/2002 | Perreault et al. | ................. 363/53 |
| 2004/0041549 A1 * | 3/2004 | Halfman et al. | ............. 323/282 |
| 2008/0284385 A1 | 11/2008 | Namuduri et al. | |

OTHER PUBLICATIONS

Finco, S, et al.; High Performance NMOS Active Zener and Rectifier Diodes; IEEE 2001.

* cited by examiner

*Primary Examiner* — Adolf Berhane
*Assistant Examiner* — Nguyen Tran

(57) ABSTRACT

Cathode-anode voltage across free-wheeling diodes in an active rectifier is used in the determination of switching points when the free-wheeling diode is forward biased. Hysteretic switching is accomplished through the selection of conductive and non-conductive switching threshold. The switching thresholds are further selected to prevent voltage oscillations at zero current crossings and reduce delays during deactivation to prevent cross-conduction.

20 Claims, 5 Drawing Sheets

US 8,064,227 B2

1

RECTIFYING CIRCUIT FOR A MULTIPHASE ELECTRIC MACHINE

CROSS REFERENCE TO RELATED APPLICATIONS

This application claims the benefit of U.S. Provisional Application No. 61/191,310 filed on Sep. 8, 2008 which is hereby incorporated herein by reference.

TECHNICAL FIELD

This disclosure is related to a switching circuit for an electric machine.

BACKGROUND

The statements in this section merely provide background information related to the present disclosure and may not constitute prior art.

Electric power generators, e.g., for automotive applications, include multiphase alternator devices that generate alternating current (AC) electric power when mechanically rotated, such as by coupling to an internal combustion engine. Known rectifier bridge circuits can convert the AC electric power to direct current (DC) electric power to meet electric load requirements. Known rectifier bridge circuits include diode bridges and MOSFET bridges.

Known electric machines and rectifier bridge circuits have power losses associated with resistance of copper wire of the electric machine, rectifier diode losses, hysteresis and eddy current, and machine friction. Known electric machines and rectifier bridge circuits have design considerations that increase mass and/or manufacturing costs including shaped conductor stator windings to reduce copper losses, thin stator laminations to reduce iron losses, low friction bearings, laminated rotor construction, and permanent magnet excitation.

SUMMARY

A rectifying apparatus for a multiphase electric machine includes an active rectifier bridge including a controllable semi-conductor switch and a free-wheeling diode having a cathode and an anode, and a switch control circuit configured to control switching of the controllable semi-conductor switch based upon a cathode-anode voltage across the free-wheeling diode when the free-wheeling diode is forward biased. A method for controlling the rectifying apparatus includes monitoring the voltage across the free-wheeling diode and controlling the switching of the controllable semi-conductor switch based upon the voltage across the free-wheeling diode when the free-wheeling diode is forward biased.

BRIEF DESCRIPTION OF THE DRAWINGS

One or more embodiments will now be described, by way of example, with reference to the accompanying drawings, in which.

DETAILED DESCRIPTION

Figure 1:
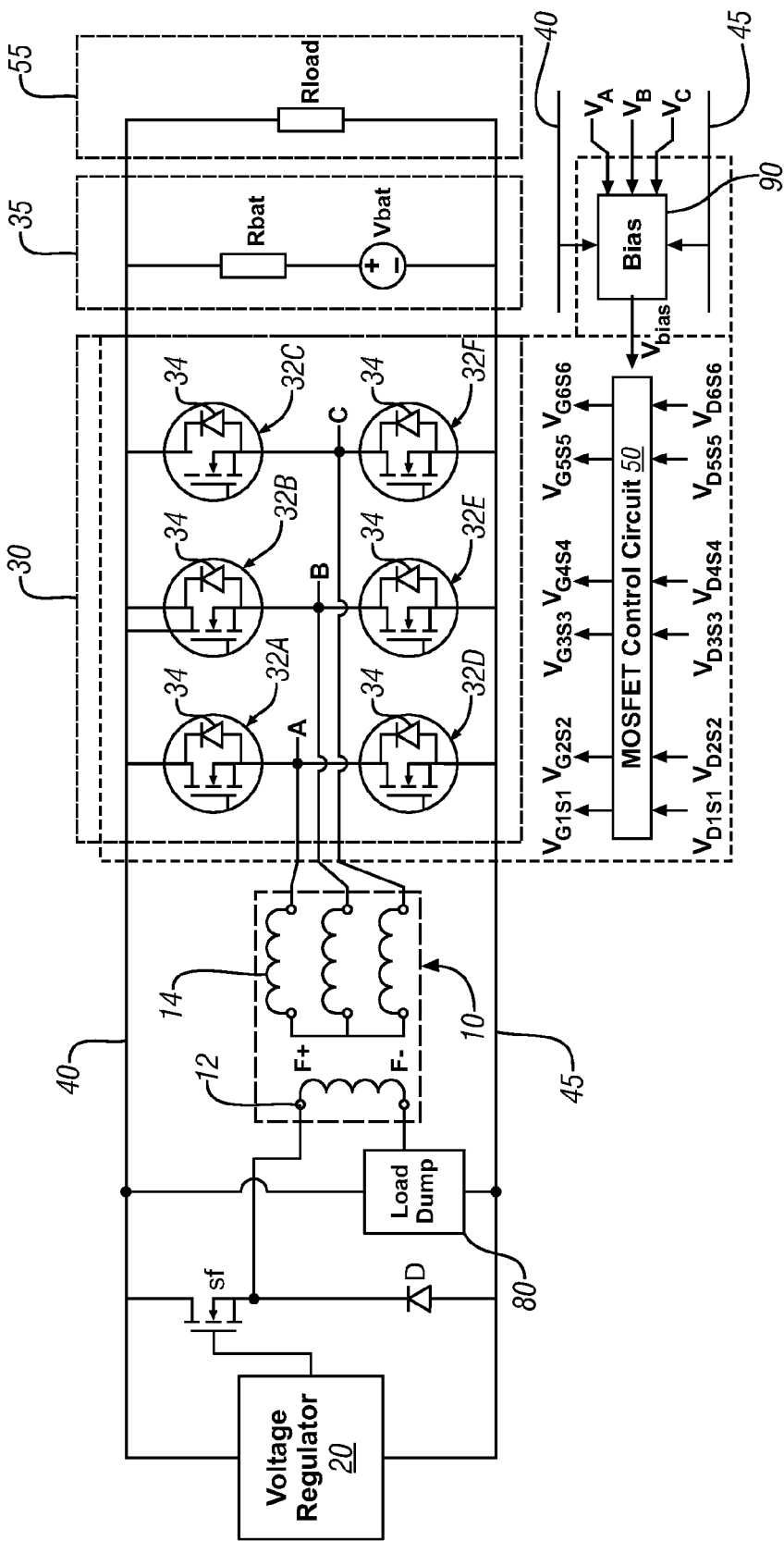
FIGS. 1 and 2 are schematic circuit diagrams in accordance with the present disclosure.

Referring now to the drawings, wherein the showings are for the purpose of illustrating certain exemplary embodiments only and not for the purpose of limiting the same, FIG. 1 schematically illustrates an electrical circuit for a multiphase electric machine 10, a voltage regulator 20 and an associated rectifying bridge circuit 30. Like numerals including those with letter suffixes refer to like elements throughout the detailed description. The multiphase electric machine 10 preferably includes a synchronous AC machine including a field winding of a rotor 12 magnetically coupled to a multiphase stator 14. The multiphase stator 14 is configured to generate an AC voltage having a waveform corresponding to each phase in response to rotation of the rotor 12. As shown, the multiphase electric machine 10 is a three-phase machine with the multiphase stator 14 including a three-phase device having outputs A, B, and C that are arranged in a "wye" configuration. Other electrical circuits analogous to those described herein can be configured and applied to other multiphase machines, e.g., four-phase, five-phase, six-phase, and seven-phase stators, and other configurations including "delta" configurations with similar effect. A positive side of the field winding (F+) of the rotor 12 electrically connects to a positive electric power bus (BAT+) 40 via a MOSFET device (sf) controlled by the voltage regulator 20. A negative side of the field winding (F−) of the rotor 12 electrically connects to a load dump energy reduction device (Load Dump) 80 that electrically connects to a negative electric power bus (BAT−) 45. The voltage regulator 20 electrically connects between the positive electric power bus 40 and the negative electric power bus 45 and regulates rectified DC output voltage from the multiphase electric machine 10 across the positive and negative electric power buses 40 and 45.

The rectifying bridge circuit 30 electrically connects to each phase A, B, and C of the multiphase stator 14, to the positive electric power bus 40 including a positive terminal for the DC output, and the negative electrical power bus 45 including a negative terminal for the DC output. Regulated DC electric power is supplied to an electrical system 55 and an electrical energy storage device 35, e.g., a lead-acid battery across the positive electric power bus 40 and the negative electrical power bus 45. A switch control module 50 signally connects to the rectifying bridge circuit 30 to control operation thereof. In one embodiment, as shown, the switch control module 50 includes the rectifying bridge circuit 30.

The rectifying bridge circuit 30 includes a plurality of switch devices 32, an upper half including devices 32A, 32B and 32C, a lower half including devices 32D, 32E and 32F and including three phase legs of paired switch devices 32A and 32D, 32B and 32E, and 32C and 32F. The paired switch devices 32A and 32D, 32B and 32E, and 32C and 32F are associated with corresponding phases A, B, C of the illustrated multiphase electric machine 10. Each of the switch devices 32 includes a semi-conductor device preferably having low-on impedance, e.g., preferably in an order of magnitude of milli-Ohms. One exemplary switch device includes a field-effect transistor device. In one embodiment the field-effect transistor device can include a MOSFET device. Alternatively, the switch devices 32 can include JFET devices, IGBT devices, BJT devices or other power transistor devices. The switch device 32 includes a control terminal (e.g. gate in FET devices; base in BJT devices) for receiving a switching control signal. A diode device 34 is connected in anti-parallel fashion across each of the switch devices 32, and is preferably incorporated therewith into a single package. Such diode devices are known as free-wheeling diodes or anti-parallel diodes. MOSFET device construction inherently includes such an anti-parallel diode and may be referred to as an intrinsic body diode. In the various figures and description of embodiments which follows, MOSFET devices are employed as switch devices; however, use of MOSFET devices is exemplary only and not limiting. Each of the switch devices 32 is controlled by an associated switch control circuit 52, and there is a paired switch control circuit, e.g., switch control circuits 52A and 52D that is associated with each of the paired switch devices, e.g., switch devices 32A and 32D.

A local bias power supply circuit 90 includes a voltage regulator device that monitors outputs from each phase of the multiphase electric machine 10 including voltage levels $V_A$, $V_B$, and $V_C$. The local bias power supply circuit 90 generates a stable supply voltage ($V_{bias}$) for the load dump energy reduction device 80 and each of the switch control circuits 52 of the switch control module 50. The local bias power supply circuit 90 monitors frequency of one of the voltage levels $V_A$, $V_B$, and $V_C$ to determine a rotational speed of the rotor 12 and thus the multiphase electric machine 10. When the rotational speed of the multiphase electric machine 10 is less than a predetermined threshold, the switch control module 50 is disabled, thus disabling switching in the rectifying bridge circuit 30 to prevent discharge of the electrical energy storage device 35 through the windings of the multiphase stator 14 of the multiphase electric machine 10.

Figure 7:
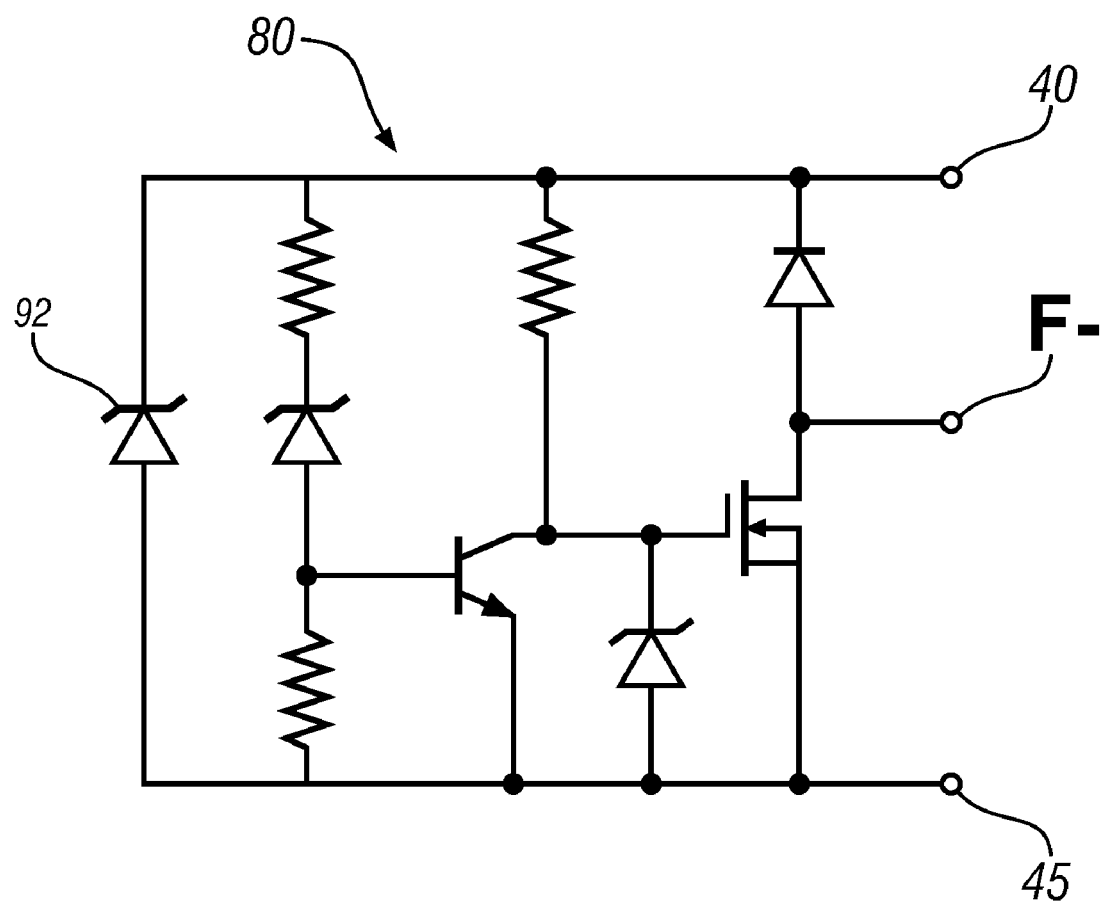
FIG. 7 is a schematic of an exemplary load dump circuit in accordance with the present disclosure.

The load dump energy reduction device 80 (Load Dump) provides a fast-field load dump for the multiphase electric machine 10. The load dump energy reduction device 80 includes an energy reduction device configured to quickly turn off the electric current to the field winding of the rotor 12 by reversing voltage across the field winding of the rotor 12 using an additional switch device between the negative terminal of the field winding (F−) of the rotor 12 and the negative electrical power bus 45. An exemplary circuit for load dump energy reduction device 80 is illustrated in FIG. 7. A load dump voltage clamping circuit 92 includes single or multiple Zener diodes having anode(s) connected to the negative electrical power bus 45 and cathode(s) connected to the positive electric power bus 40.

Figure 2:
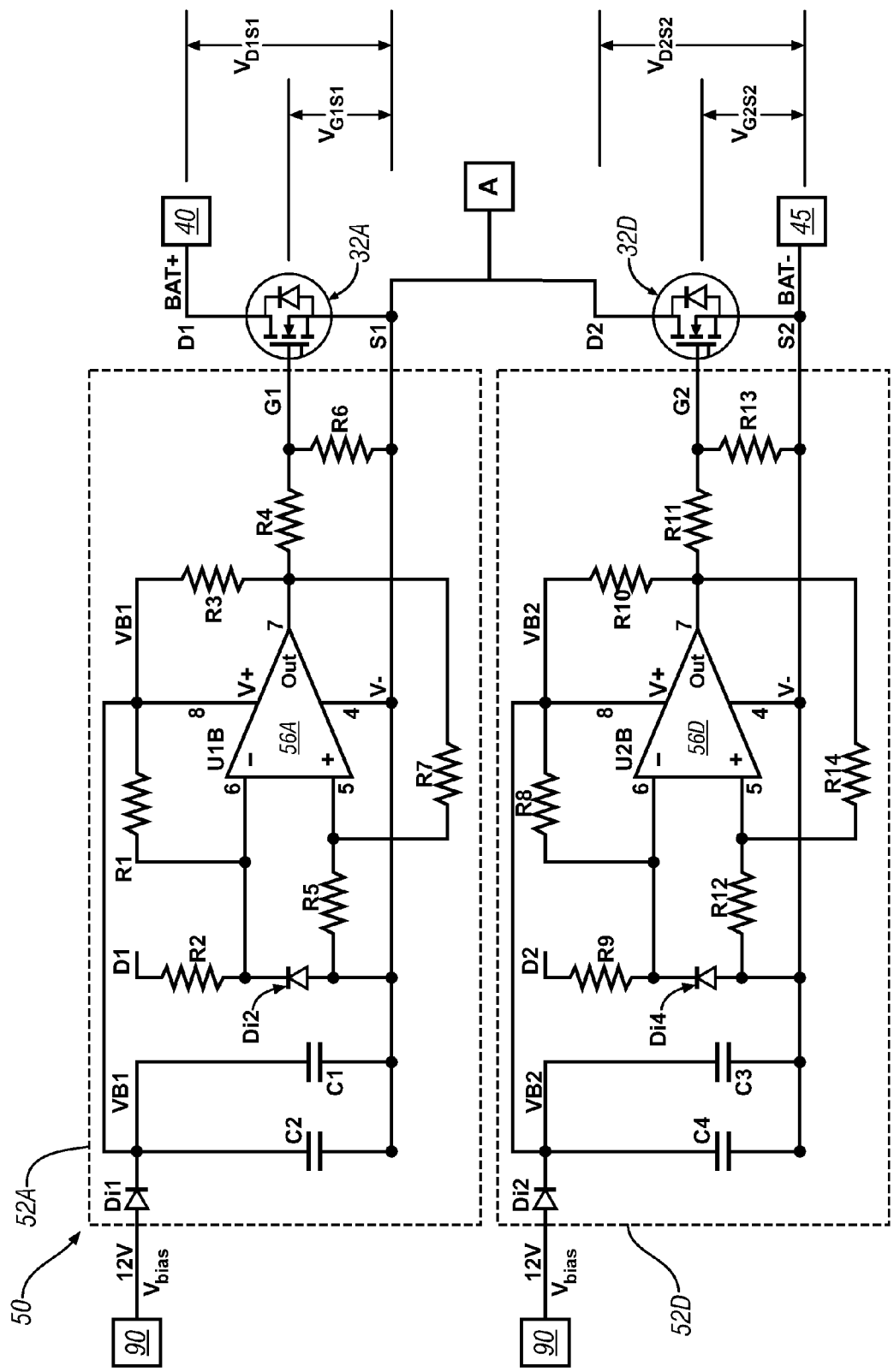

FIG. 2 schematically shows a portion of the switch control module 50 including paired switch control circuits including upper-half switch control circuit 52A signally connected to switch device 32A and lower-half switch control circuit 52D signally connected to switch device 32D, each which is associated with phase A of the illustrated multiphase stator 14 of the multiphase electric machine 10. A person having ordinary skill in the art understands that this configuration of switch control circuits 52 and associated paired switch control circuits is repeated for each phase of the multiphase electric machine 10.

Each switch control circuit 52 includes an electronic control circuit including a precision comparator device 56 having a single power supply and including feedback circuits constructed from resistors in one embodiment to provide negative and positive feedback to control switch voltage threshold levels. The preferred precision comparator device 56 has an offset voltage of less than 5 mV.

The local bias power supply circuit 90 electrically connects to each of the switch control circuits 52 to provide the supply voltage ($V_{bias}$) to each comparator device 56, including electrically powering each of the comparator devices 56 at a single voltage terminal (V+). The lower voltage terminal (V−) is preferably common to all the lower-half switch control circuits, e.g., the lower-half switch control circuit 52D signally connected to switch device 32D associated with phase A and other lower-half switch control circuits signally connected to switch devices 32E and 32F associated with phases B and C respectively. The lower voltage terminal (V−) for the upper-half switch control circuits is connected to the source terminal S1 of the associated upper switch 32, e.g., the source terminal S1 of the switch device 32A associated with phase A and other source terminals signally connected to switch devices 32B and 32C associated with phases B and C respectively. Each switch control circuit 52 electrically connects to one of the switch devices 32 of the rectifying bridge circuit 30 at a drain D, source S, and a gate G, as shown in this embodiment. This includes a switch signal $V_{GS}$ output from the switch control circuit 52 that is signally connected to the gate G of the switch device 32 to control current flow therethrough.

Figure 5:
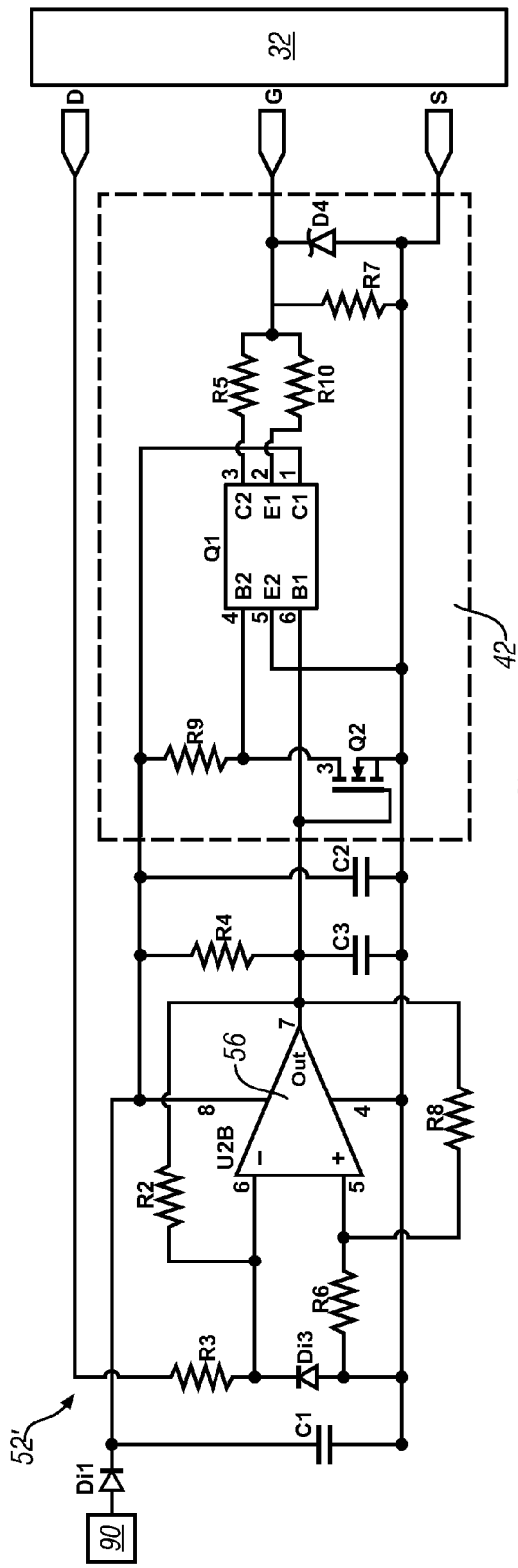
FIGS. 5 and 6 are schematic circuit diagrams in accordance with the present disclosure.
Figure 6:
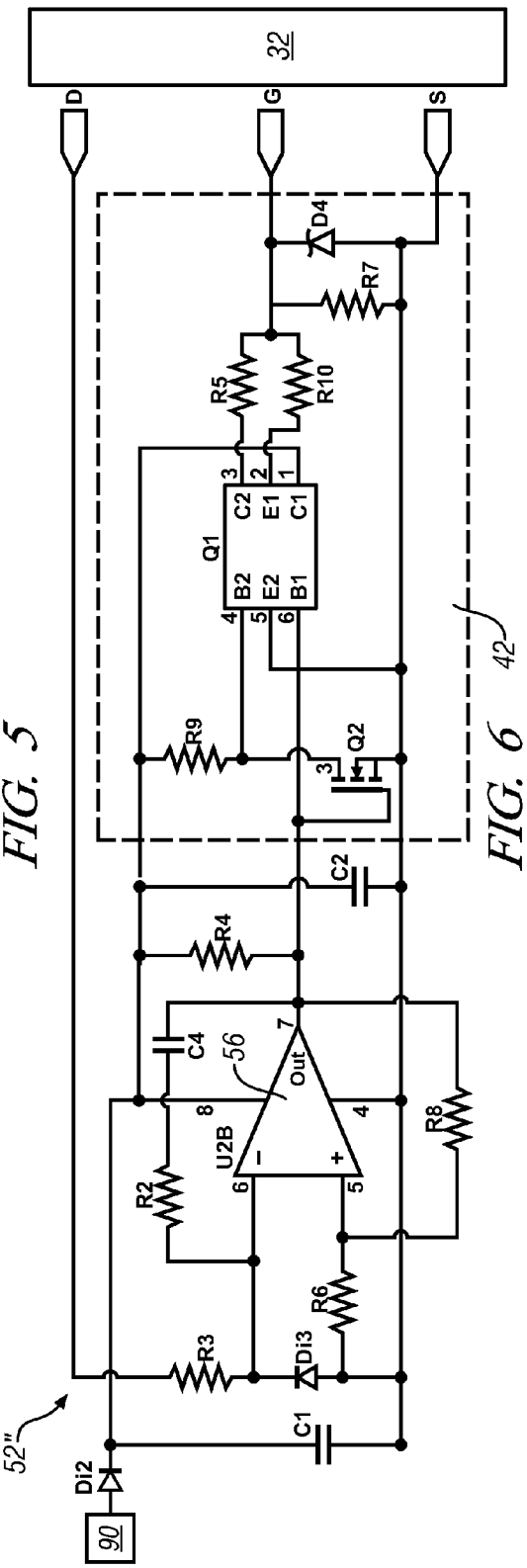

Alternatively, as shown in FIGS. 5 and 6, the switch signal $V_{GS}$ output from the switch control circuit 52 connects to a buffer circuit 42 including intermediary switch devices Q1 and Q2 that connect to gate G of the switch device 32. Each switch control circuit 52 connects to one of the phases of the multiphase electric machine 10 via an associated set of the paired switch devices and the buffer circuits 42. This configuration enables the switch control circuit 52 to control conduction across the respective switch device 32 associated with a corresponding switch signal.

Referring again to FIG. 2, the illustrated portion of the switch control module 50 includes switch control circuits 52A and 52D signally connected to switch devices 32A and 32D respectively, and associated with phase A of the illustrated multiphase electric machine 10.

Switch control circuit 52A signally connects to switch device 32A of the rectifying bridge circuit 30 at gate G1, with drain D1 electrically connected to the positive electric power bus 40 and source 51 electrically connected to phase A of the illustrated multiphase electric machine 10 in this embodiment. Freewheeling diode (intrinsic body diode in MOSFET application) is shown with anode coupled to source 51 and cathode coupled to drain D1. A signal output from pin 7 of the comparator device 56A generates switch signal $V_{G1S1}$ after passing through electric circuits, electrically connecting to gate G1 of the switch device 32A to control current flow through the switch device 32A. The supply voltage circuit 90 provides the supply voltage ($V_{bias}$) through diode Di1 to supply voltage VB1 that is the single voltage terminal (V+) at pin 8 of the comparator device 56A, with the lower voltage terminal (V−) at pin 4 of the comparator device 56A electrically connected the source S1.

Switch control circuit 52D signally connects to switch device 32D of the rectifying bridge circuit 30 at gate G2, with drain D2 electrically connected to phase A of the illustrated multiphase electric machine 10 and source S2 electrically connected to the negative electrical power bus 45 in this embodiment. A signal output from pin 7 of the comparator device 56D generates switch signal $V_{G2S2}$ after passing through electric circuits, electrically connecting to gate G2 of the switch device 32D to control current flow through the switch device 32D to control current flow therethrough. The power supply circuit 90 provides the supply voltage ($V_{bias}$) across diode D12 to supply voltage VB2 to the single voltage terminal (V+) at pin 8 of the comparator device 56D, with the lower voltage terminal (V−) at pin 4 of the comparator device 56D electrically connected the source S2, which is electrically connected to the negative electrical power bus 45.

Each switch control circuit 52 uses the comparator device 56 to directly measure the drain-source voltage $V_{DS}$, or equivalently the cathode-anode voltage $V_{CA}$, across the switch device 32 and respond by controlling the gate-source voltage $V_{GS}$ to the switch device 32. The circuits constructed from resistors in the embodiment shown provide negative and positive feedback to the comparator device 56. The resistors providing negative and positive feedback are used to provide switch hysteresis related to activating and deactivating the respective switch device 32, thus controlling current flow for rectification as described in further detail herein below.

Voltage signals associated with activating and deactivating each switch device 32 are controlled by comparing the drain-source voltage $V_{DS}$ (cathode-anode voltage $V_{CA}$) with predetermined upper and lower switch voltage threshold levels during a negative region of the associated drain-source voltage $V_{DS}$ (cathode-anode voltage $V_{CA}$). A switch device is conductive (ON) when activated and non-conductive (OFF) when deactivated. Thus, in one embodiment each switch control circuit 52 can activate (turn ON) the respective switch device 32 when the drain-source voltage $V_{DS}$ (cathode-anode voltage $V_{CA}$) is less than a first switch voltage threshold $V_{TH}$ and can deactivate (turn OFF) the respective switch device 32 when the drain-source voltage $V_{DS}$ (cathode-anode voltage $V_{CA}$) is greater than a second switch voltage threshold $V_{TL}$, using predetermined switch voltage hysteresis levels. $V_{TH}$ is selected to activate (turn ON) the switch device at a point where a diode in a conventional diode bridge rectifier would start conducting. Similarly, $V_{TL}$ is selected to deactivate (turn OFF) the switch device just before the current in that switch would have naturally crossed a zero level. Exemplary switch voltage threshold levels include $V_{TH} \approx -100$ mV and $V_{TL} \approx -10$ mV. Operation using switch voltage hysteresis levels provides controlled switch activation to prevent voltage oscillations at zero current crossings as well as to prevent cross-conduction (of upper and lower half switch devices), and reduces delays during deactivation to prevent cross-conduction. One having ordinary skill in the art can readily set switch voltage threshold levels $V_{TH}$ and $V_{TL}$ through selection of feedback resistors. Exemplary switch control circuits employing precision comparators and resistor networks are set forth in further detail herein below.

The drain-source voltage $V_{DS}$ (cathode-anode voltage $V_{CA}$) across the switch device 32A is depicted as $V_{D1S1}$ and the gate-source voltage $V_{GS}$ across the switch device 32A is depicted as $V_{G1S1}$. The drain-source voltage $V_{DS}$ (cathode-anode voltage $V_{CA}$) across the switch device 32D is depicted as $V_{D2S2}$ and the corresponding voltage to the gate-source $V_{GS}$ is depicted as $V_{G2S2}$. Switch control circuit 52A uses the comparator device 56A to directly measure the drain-source voltage $V_{D1S1}$ (cathode-anode voltage $V_{CA}$) across the switch device 32A and responds by controlling the gate-source voltage $V_{G1S1}$ to the switch device 32A. Similarly, switch control circuit 52D uses the comparator device 56D to directly measure the drain-source voltage $V_{D2S2}$ (cathode-anode voltage $V_{CA}$) across the switch device 32D and responds by controlling the gate-source voltage $V_{G2S2}$ to the switch device 32D. The circuits constructed from resistors in the embodiment shown provide negative and positive feedback to the comparator devices 56A and 56D. The resistors providing negative and positive feedback are used to provide predetermined switch voltage hysteresis levels to activate and deactivate respective switch devices 32. Switch device 32 activation and deactivation are controlled by comparing the measured drain-source (cathode-anode) voltage, e.g., $V_{D1S1}$ and $V_{D2S2}$ with predetermined upper and lower switch voltage threshold levels during a negative region of an associated drain-source voltage $V_{DS}$ (cathode-anode voltage $V_{CA}$) of the respective switch device 32.

Resistors R3 and R4 cooperate with the gate capacitance of switch device 32A to establish desired rise time of the switch signal output from the comparator device 56A. It is desirable to control rise time of the of the switch signal output to prevent voltage oscillations at zero current crossings as well as to prevent cross-conduction. Therefore, resistors R3 and R4 are chosen such that gate-source voltage $V_{G1S1}$ reaches the voltage required to fully turn on switch device 32A at a predetermined rate or at a predetermined time thereby establishing switch 32A conductive subsequent to zero current crossings. In the present exemplary embodiment, the switch device 32A is assumed fully turned on at substantially 10V. Preferably, this predetermined time is in the range of about 10 microseconds to about 1 millisecond. Such a rise time delay can be seen in the rising traces of either gate-source voltage $V_{G1S1}$ or $V_{G2S2}$ in FIG. 3. In one embodiment, resistor R3 is 3 kΩ and resistor R4 is 50Ω.

Resistors R5 and R7 have impedance values to control signal hysteresis and resistors R1 and R2 have impedance values to control a switch voltage threshold level for activation of the comparator device 56A and thus the switch device 32A in accordance with well known ratiometric relationships. The signal output of the comparator device 56A connects to gate G1 of the switch device 32A, thus controlling electrical current flow between source S1 and drain D1 of the switch device 32A. Thus activation and deactivation of the switch device 32A are controlled by comparing the corresponding drain-source voltages $V_{D1S1}$ (cathode-anode voltages $V_{CA}$) in relation to predetermined upper and lower switch voltage threshold levels during a negative region of the waveform of the AC voltage when the free-wheeling diode 34 is forward-biased, as established by the selection of resistors R1, R2, R5 and R7. In one embodiment resistor R5 is 10 kΩ, resistor R7 is 20 MΩ, resistor R1 is 5 MΩ and resistor R2 is 10 kΩ. Furthermore, in one embodiment resistor R6 is 100 kΩ. Switch control circuit 52D is similarly configured.

In addition the switch control circuit 52A uses capacitors C1 and C2 connected in parallel between VB1 and S1 to provide boot-strap power for high-side MOSFET control logic. In one embodiment C1 is 0.1 μF and C2 is 4.7 μF. A single capacitor can be used in place of C1 and C2. Switch control circuit 52B has a similar circuit. Each switch control circuit 52 can be implemented as an assembly of discrete elements or preferably as an application-specific integrated circuit (ASIC).

Figure 3:
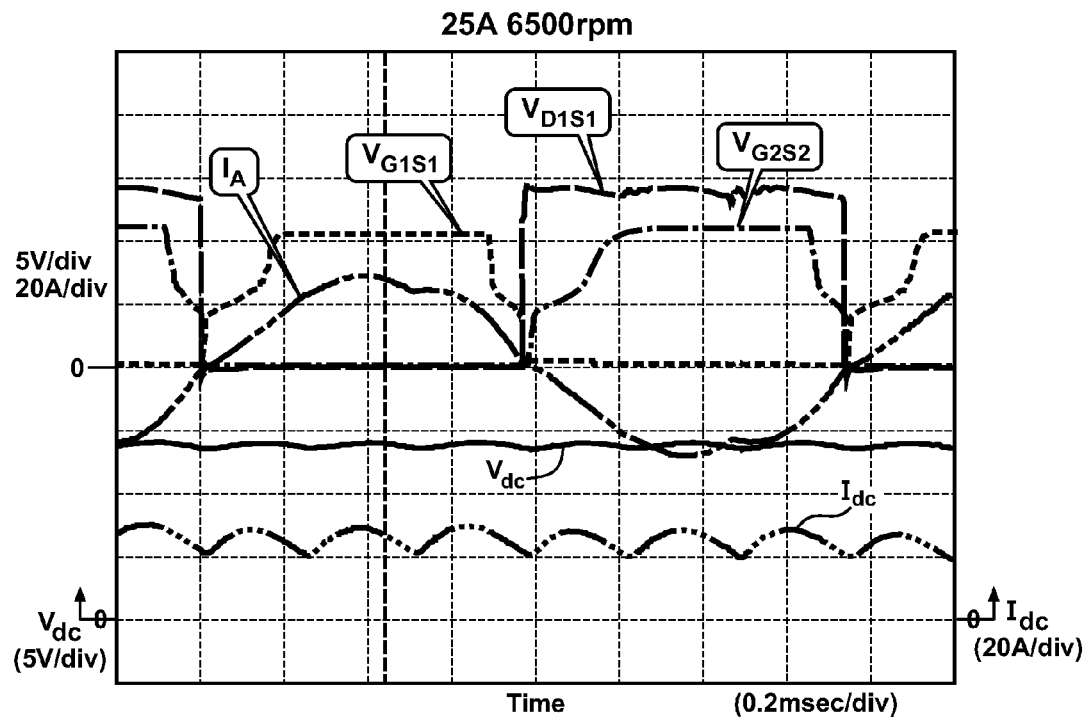
FIGS. 3 and 4 are graphical depictions of operating results in accordance with the present disclosure.
Figure 4:
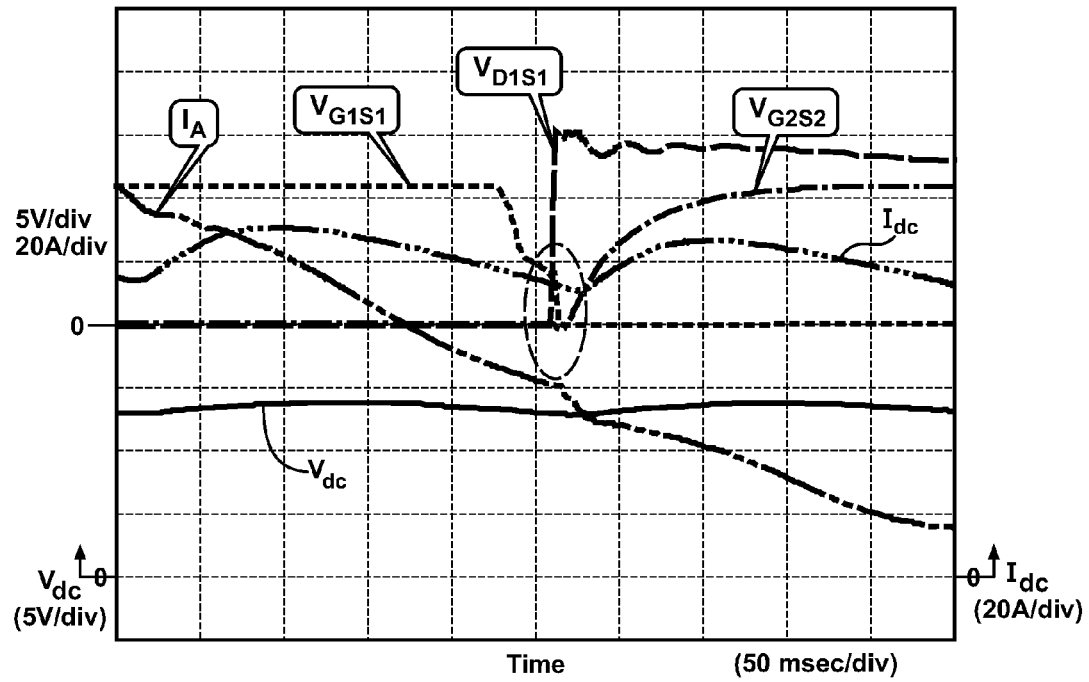

FIGS. 3 and 4 show exemplary data illustrative of operation of the system described herein, depicting the voltage potential between the signal output of the comparator device 56 and the source S1 of the switch device 32A ($V_{G1S1}$), the voltage potential across the source S1 and drain D1 (voltage potential across the cathode C and anode A) of the switch device 32A ($V_{D1S1}$), and corresponding electrical current flow ($I_A$), with an exemplary circuit operating at 6500 rpm and the system drawing 25 A of current. The voltage potential between the signal output of the comparator device 56 and the source S1 of the switch device 32D ($V_{G2S2}$) is also shown, to demonstrate complete operation of one phase of the circuit.

FIG. 5 shows another embodiment of the switch control circuit 52', including the aforementioned circuit described with reference to FIG. 2. In addition, resistors R2, R3, R6 and R8 provide an adaptive switch voltage threshold level, with the RC circuit of R4 and C3 providing an output rise time control for the switch signal output from the comparator device 56. The switch signal output from the comparator device 56 connects and controls an additional buffer circuit 42 that signally connects to gate G to control one of the switch devices 32 shown with reference to FIG. 2.

The buffer circuit 42 uses switch devices Q1 and Q2 with associated circuits including Zener diode D4 for gate protection of the switch device 32. This embodiment can be employed when the switch device 32 is a high current switch device requiring higher current output to the gate G than is achievable with the signal output of the comparator device 56. In one embodiment, resistor R2 is 5 MΩ, resistor R3 is 3 kΩ, resistor R4 is 20 kΩ, resistor R5 is 20Ω, resistor R6 is 10 kΩ, resistor R7 is 100 kΩ, resistor R8 is 20 MΩ, resistor R9 is 10 kΩ, and resistor R10 is 499Ω. In one embodiment, capacitor C1 is 0.1 μF, capacitor C2 is 10 μF and capacitor C3 is 1.5 nF.

FIG. 6 shows another embodiment of the switch control circuit 52", including the aforementioned circuit described with reference to FIG. 2. In addition, resistors R2, R3, R6 and R8 and capacitor C4 provide adaptive switch voltage threshold levels with negative AC feedback control. The RC circuit of R4 and C3 again provides an output rise time control for the switch signal output from the comparator device 56. The switch signal output from the comparator device 56 connects and controls an additional buffer circuit 42' that signally connects to gate G to control one of the switch devices 32 shown with reference to FIG. 2. The buffer circuit 42 is analogous to that shown with reference to FIG. 5.

In one embodiment the rectifier bridge circuit 30 includes a reverse polarity protection circuit, including one of a fusible link, a fuse and a low forward voltage drop Schottky diode oriented with an anode connected to the negative electrical power bus 45 and a cathode connected to the positive electric power bus 40.

In one embodiment, the voltage regulator 20 is a known device, and a second system includes the local bias power supply circuit 90, the load dump energy reduction device 80 and the switch control module 50 including the rectifying bridge circuit 30 as a stand-alone circuit that provides active rectifier bridge, voltage bias, control, low-speed protection, reverse voltage protection and load dump protection.

The disclosure has described embodiments wherein all rectifying elements of the rectifier bridge are controllable and wherein the switching of all rectifying elements is controlled based upon cathode-anode voltage of respective free-wheeling diodes. Other embodiments, including rectifier bridges having both passive and controllable rectifier elements (i.e. upper-half diodes, lower-half controllable switches) are envisioned wherein switching of all controllable rectifier elements are controlled based upon cathode-anode voltage of respective free-wheeling diodes.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A rectifying apparatus for a multiphase electric machine, comprising:
    an active rectifier bridge including a controllable semi-conductor switch and a free-wheeling diode having a cathode and an anode; and
    a switch control circuit configured to control switching of the controllable semi-conductor switch based upon a cathode-anode voltage across the free-wheeling diode when the free-wheeling diode is forward biased;
    wherein the switch control circuit is configured to control switching of the controllable semi-conductor switch conductive when the cathode-anode voltage across the free-wheeling diode is less than a first threshold voltage and to control switching of the controllable semi-conductor switch non-conductive when the cathode-anode voltage across the free-wheeling diode is greater than a second threshold voltage, wherein the first threshold voltage is less than the second threshold voltage.

2. The rectifying apparatus of claim 1 wherein the switch control circuit comprises a comparator circuit including negative and positive feedback and having an output coupled to the controllable semi-conductor switch.

3. The rectifying apparatus of claim 2 wherein the switch control circuit further comprises a buffer circuit disposed between the comparator circuit output and the controllable semi-conductor switch.

4. The rectifying apparatus of claim 1 wherein the first threshold voltage is about −10 mV and said second threshold is about −100 mV.

5. The rectifying apparatus of claim 1 wherein the second threshold voltage is about one order of magnitude greater than the first threshold voltage.

6. The rectifying apparatus of claim 1 wherein the controllable semi-conductor switch is in an upper-half of the active rectifier bridge.

7. The rectifying apparatus of claim 1 wherein the controllable semi-conductor switch is in a lower-half of the active rectifier bridge.

8. A rectifying apparatus for a multiphase electric machine, comprising:
    an active rectifier bridge including a controllable semi-conductor switch and a free-wheeling diode having a cathode and an anode; and
    a switch control circuit configured to control switching of the controllable semi-conductor switch based upon a cathode-anode voltage across the free-wheeling diode when the free-wheeling diode is forward biased;
    wherein the switch control circuit comprises a comparator having an output coupled to a control terminal of the controllable semi-conductor switch, the comparator configured to monitor the cathode-anode voltage across the free-wheeling diode, compare the cathode-anode voltage to a first threshold voltage when the output coupled to the control terminal of the controllable semi-conductor switch is controlling the controllable semi-conductor non-conductive, and compare the cathode-anode voltage to a second threshold voltage when the output coupled to the control terminal of the controllable semi-conductor switch is controlling the controllable semi-conductor conductive, wherein the first threshold voltage is less than the second threshold voltage, and wherein the comparator output controls the controllable semi-conductor conductive from non-conductive when the cathode-anode voltage across the free-wheeling diode crosses the first threshold voltage and the comparator output controls the controllable semi-conductor non-conductive from conductive when the cathode-anode voltage across the free-wheeling diode crosses the second threshold voltage.

9. The rectifying apparatus of claim 1 further comprising a load dump protection circuit.

10. The rectifying apparatus of claim 1 wherein the controllable semi-conductor switch comprises a MOSFET device and the free-wheeling diode comprises an intrinsic body diode.

11. The rectifying apparatus of claim 1 wherein the controllable semi-conductor switch comprises one of a MOSFET device, a JFET device, an IGBT device and a BJT device.

12. The rectifying apparatus of claim 1 wherein the switch control circuit is configured to control switching of the controllable semi-conductor switch conductive at about 10 microseconds to about 1 millisecond subsequent to a zero current crossing event.

13. A method for controlling a rectifying apparatus for a multiphase electric machine, comprising:
    monitoring a voltage across a free-wheeling diode corresponding to a controllable semi-conductor switch; and
    controlling the switching of the controllable semi-conductor switch based upon the voltage across the free-wheeling diode when the free-wheeling diode is forward biased;
    wherein controlling the switching of the controllable semi-conductor switch based upon the voltage across the free-wheeling diode when the free-wheeling diode is forward biased comprises:
        measuring a cathode-anode voltage of the free-wheeling diode;
        switching the controllable semi-conductor switch conductive when the cathode-anode voltage across the free-wheeling diode is less than a first threshold voltage; and
        switching the controllable semi-conductor switch non-conductive when the cathode-anode voltage across the free-wheeling diode is greater than a second threshold voltage;
    wherein the first threshold voltage is less than the second threshold voltage.

14. The method for controlling a rectifying apparatus of claim 13 wherein the first threshold voltage is about −10 mV and said second threshold is about −100 mV.

15. The method for controlling a rectifying apparatus of claim 13 wherein the second threshold voltage is about one order of magnitude greater than the first threshold voltage.

16. A method for controlling a rectifying apparatus for a multiphase electric machine, comprising:
    monitoring a voltage across a free-wheeling diode corresponding to a controllable semi-conductor switch; and
    controlling the switching of the controllable semi-conductor switch based upon the voltage across the free-wheeling diode when the free-wheeling diode is forward biased.
    wherein controlling the switching of the controllable semi-conductor switch based upon the voltage across the free-wheeling diode when the free-wheeling diode is forward biased comprises:
        monitoring a cathode-anode voltage across the free-wheeling diode;
        comparing the cathode-anode voltage to a first threshold voltage when the controllable semi-conductor switch is non-conductive;
        comparing the cathode-anode voltage to a second threshold voltage when the controllable semi-conductor switch is conductive;
        controlling the controllable semi-conductor conductive from non-conductive when the cathode-anode voltage across the free-wheeling diode crosses the first threshold voltage; and
        controlling the controllable semi-conductor non-conductive from conductive when the cathode-anode voltage across the free-wheeling diode crosses the second threshold voltage;
    wherein the first threshold voltage is less than the second threshold voltage.

17. The method for controlling a rectifying apparatus of claim 13 further comprising monitoring a rotational speed of the multiphase electric machine and controlling the controllable semi-conductor switch nonconductive when the rotational speed is below a predetermined threshold speed.

18. The method for controlling a rectifying apparatus of claim 13 further comprising switching the controllable semi-conductor switch conductive at about 10 microseconds to about 1 millisecond subsequent to a zero current crossing event.

19. A rectifying apparatus for a multiphase electric machine comprising:
    a rectifying bridge circuit comprising a plurality of paired controllable semi-conductor switches, each semi-conductor switch having an associated free-wheeling diode having a cathode and an anode;
    a local bias power supply circuit;
    a plurality of switch control circuits, each switch control circuit associated with one of the semi-conductor switches of the rectifying bridge circuit; and
    each switch control circuit including a comparator circuit including negative and positive feedback and having an output coupled to a control terminal of the controllable semi-conductor switch, the comparator circuit configured to monitor a cathode-anode voltage across the free-wheeling diode, compare the cathode-anode voltage to a first threshold voltage when the output coupled to the control terminal of the controllable semi-conductor switch is controlling the controllable semi-conductor non-conductive, and compare the cathode-anode voltage to a second threshold voltage when the output coupled to the control terminal of the controllable semi-conductor switch is controlling the controllable semi-conductor conductive, wherein the first threshold voltage is less than the second threshold voltage, and wherein the comparator output controls the controllable semi-conductor conductive from non-conductive based upon the cathode-anode voltage across the free-wheeling diode crossing the first threshold voltage and the comparator output controls the controllable semi-conductor non-conductive from conductive based upon the cathode-anode voltage across the free-wheeling diode crossing the second threshold voltage.

20. The rectifying apparatus of claim 19 wherein the comparator output controls the controllable semi-conductor conductive from non-conductive at about 10 microseconds to about 1 millisecond subsequent to a zero current crossing event.

* * * * *